May 26, 1970     M. C. KOLLING ET AL     3,514,000
MOBILE TRUCKING EQUIPMENT
Original Filed Oct. 10, 1968     5 Sheets-Sheet 1
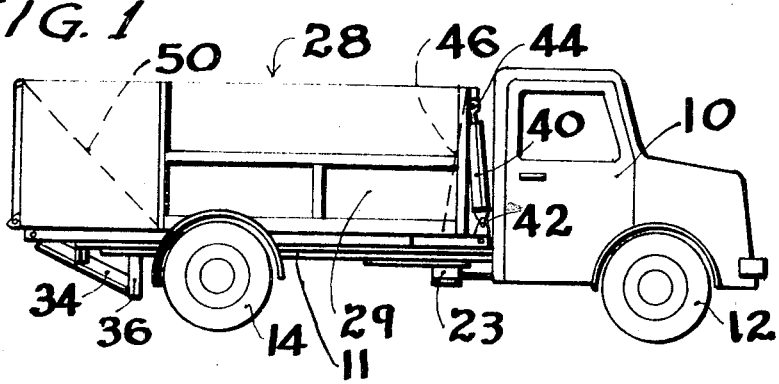
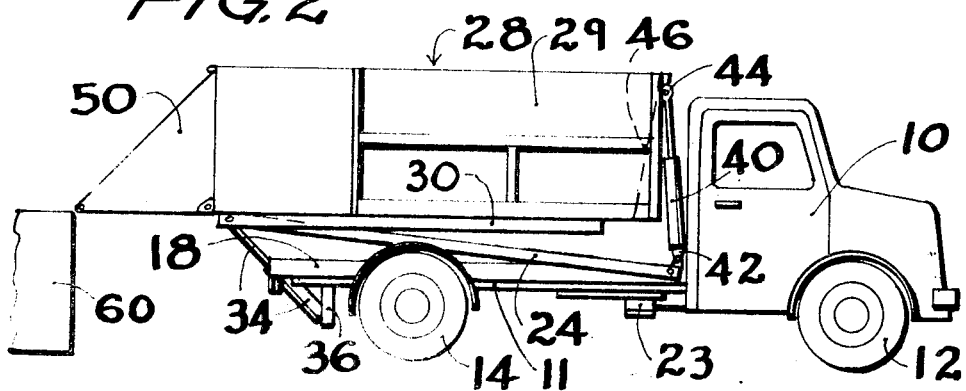
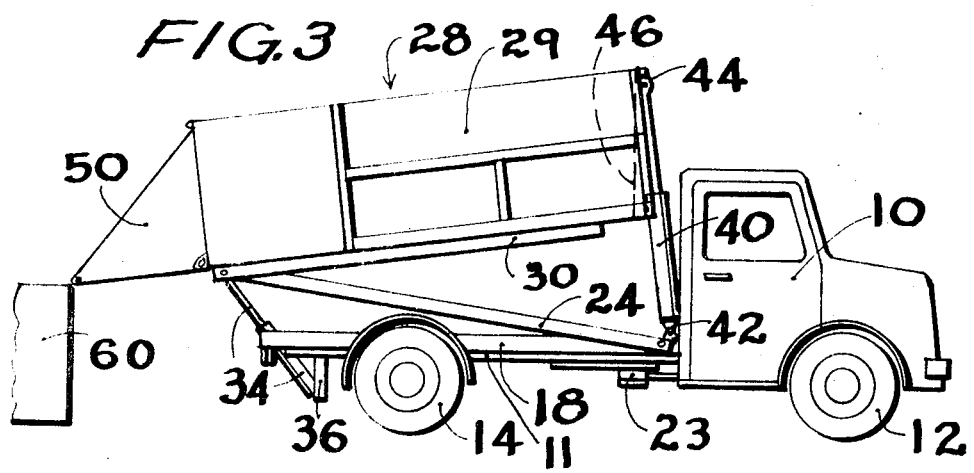
INVENTORS
MELVYN C. KOLLING
ALLEN W. KLITZKE
RODERICK H. HEIN
BY
Donald H Sweet

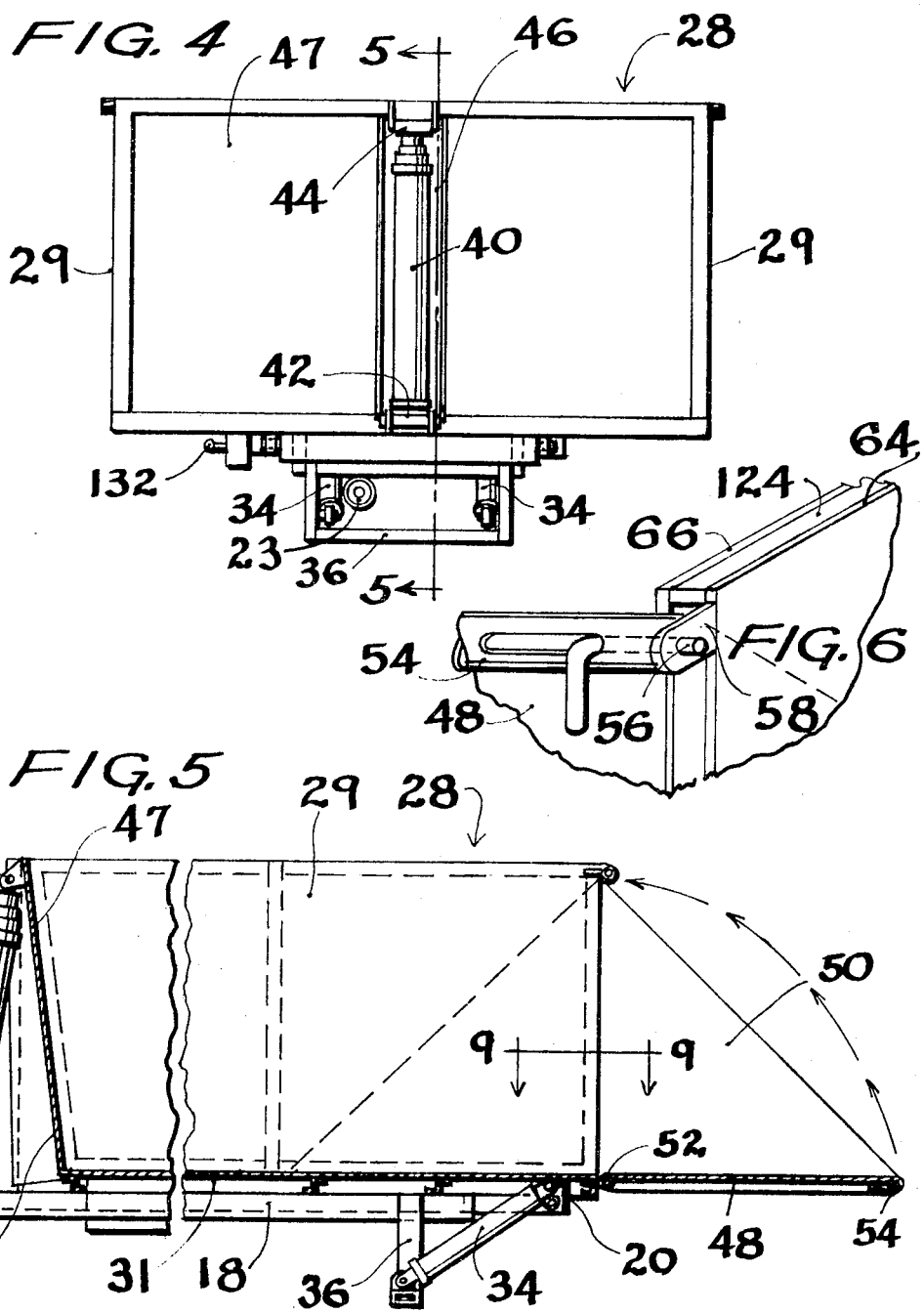

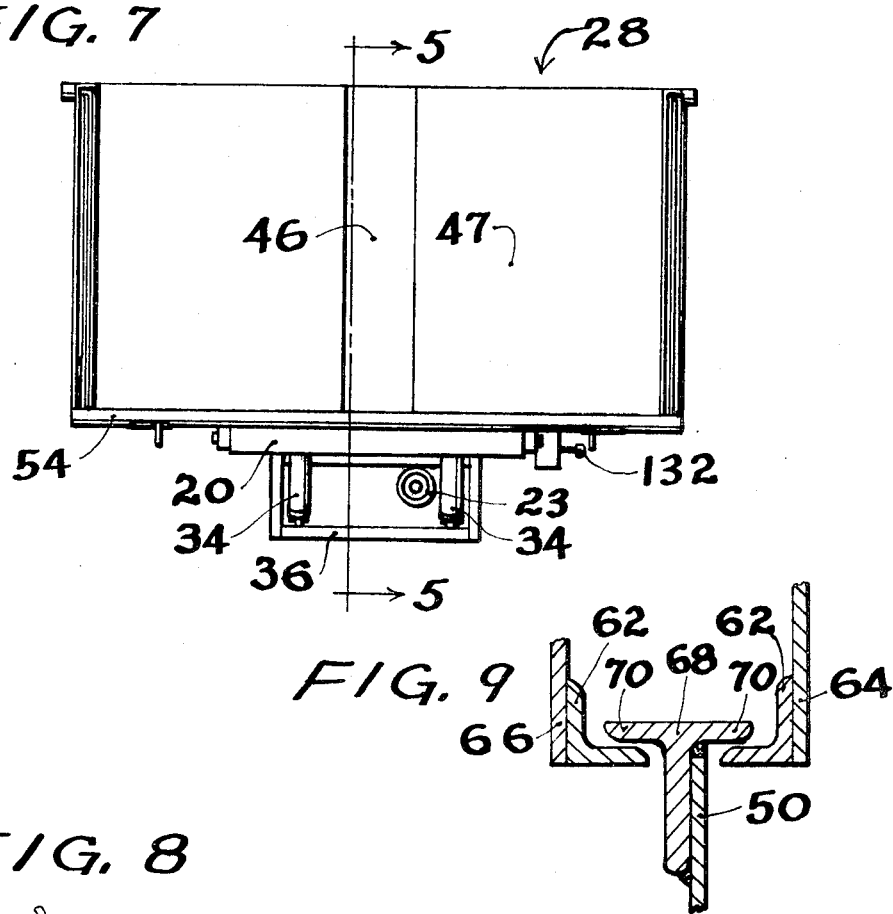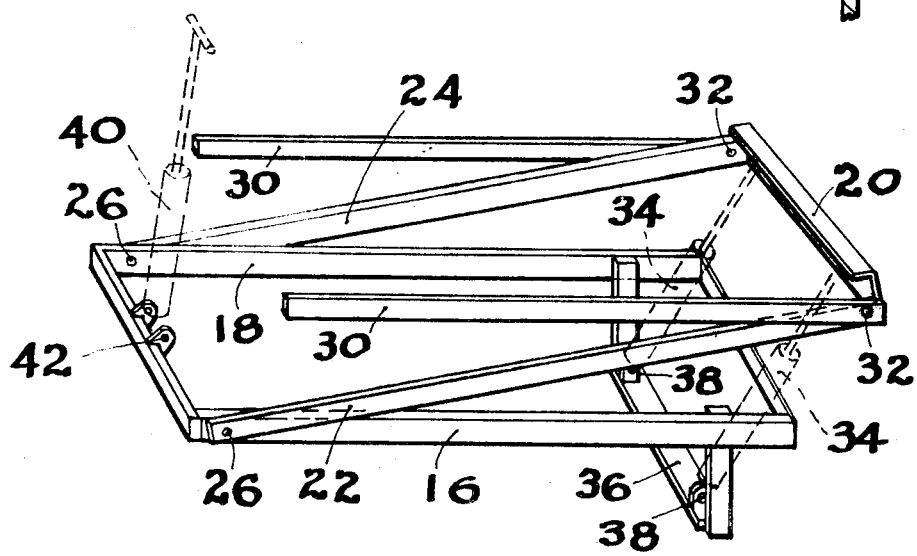

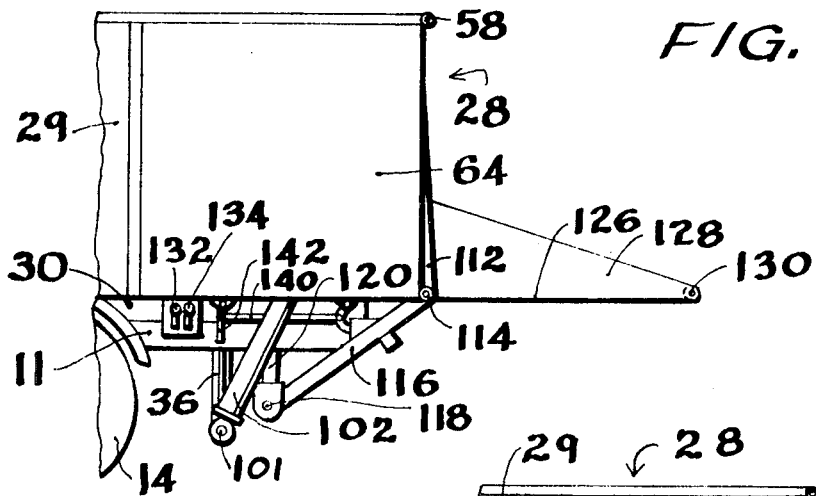
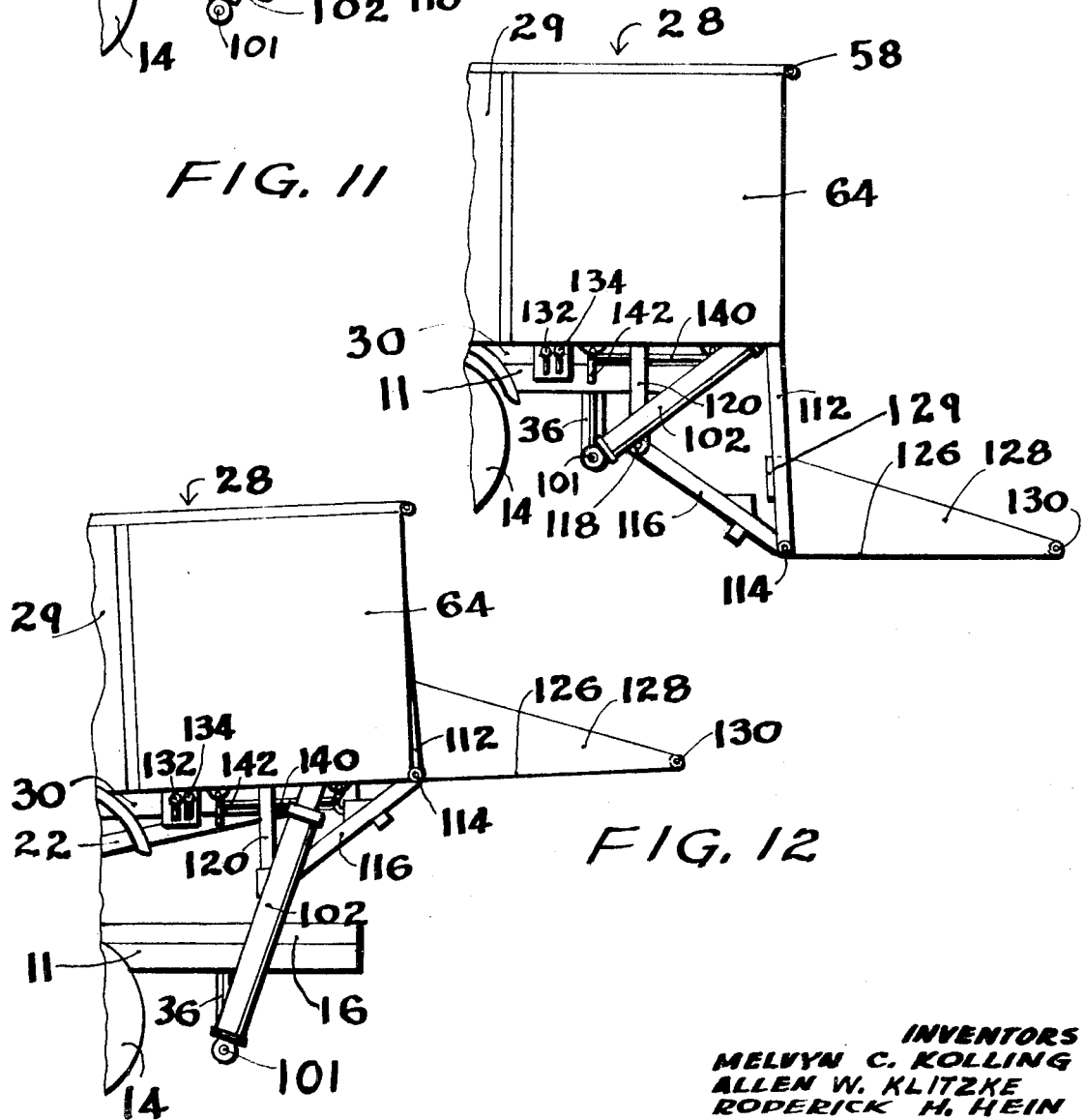

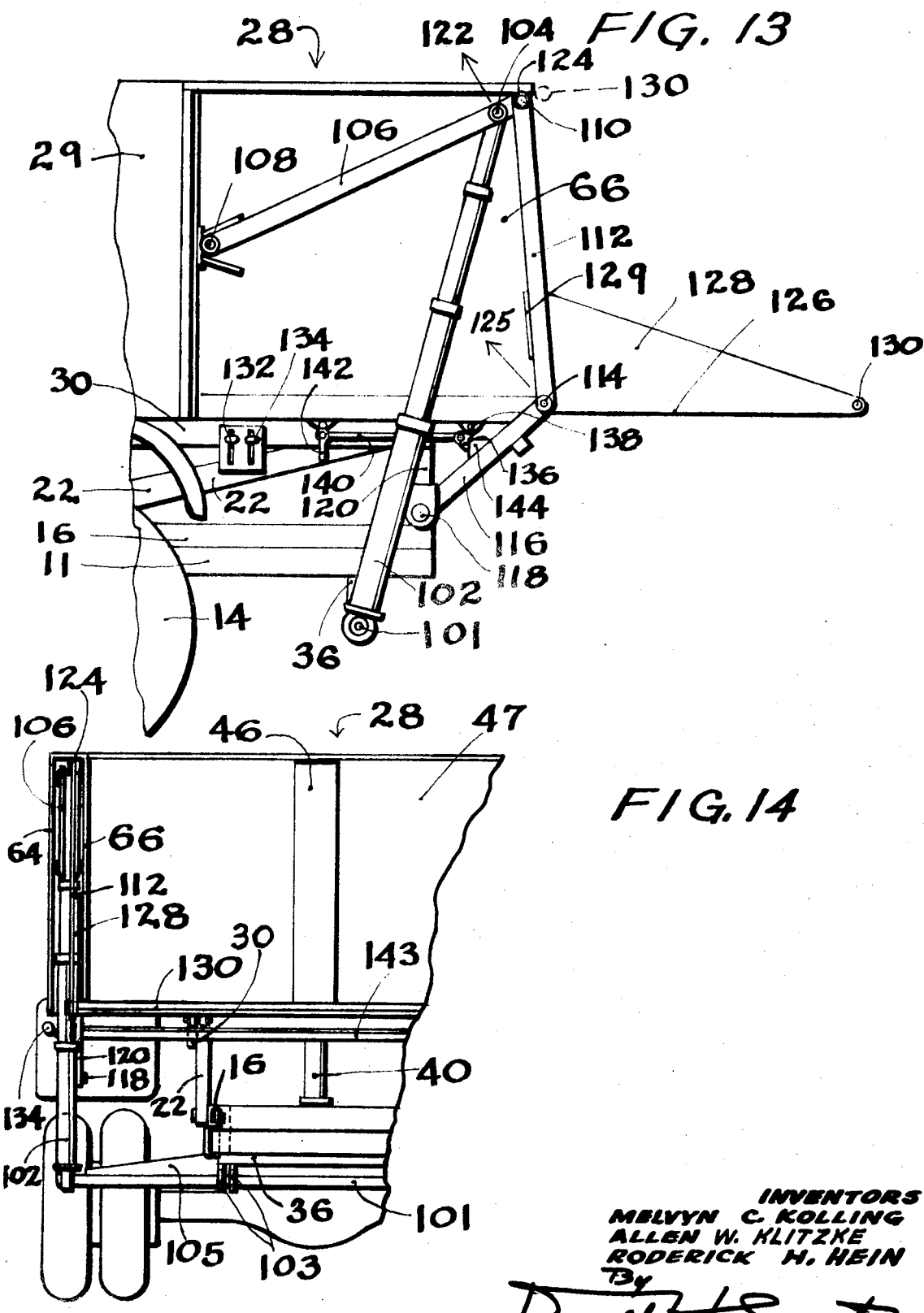

United States Patent Office 3,514,000
Patented May 26, 1970

3,514,000
MOBILE TRUCKING EQUIPMENT
Melvyn C. Kolling, 351 Elm Ave., Elmhurst, Ill. 60126; Allen Klitzke, 1200 SW. Fairview, Park Ridge, Ill. 60068; and Roderick H. Hein, 125 W. 3rd St., Elmhurst, Ill. 60126
Continuation of application Ser. No. 585,568, Oct. 10, 1968. This application Mar. 3, 1969, Ser. No. 805,110
Int. Cl. B60p *1/44*
U.S. Cl. 214—502     23 Claims

ABSTRACT OF THE DISCLOSURE

Transverse pivot connections at the rear end of a load support are themselves pivoted, as by radius rods, about a horizontal transverse axis near the front end of the support. Hydraulic jack means provide precise adjustment of the height to which the rear end of the load support may be raised. The front end of the load support may be independently lifted up by other independently adjustable hydraulic jack means at the front end, to lift the front end by rotation around a rear end pivot on the load support. A supplemental feature is a rear gate pivoted on the load support on a transverse pivot at the rear end. The same jacks that lift the rear end of the support can go on down after the load support is at rest on the chassis, and let the gate open, first in rearward and downward rotation into a coplanar extension of the load support floor, and subsequently vertically downward without rotation to a receiving level close to ground level. All these operations are selectively controlled by a single operator standing on the ground beside the rear end of the load support.

CROSS-REFERENCE TO RELATED APPLICATION

This application is a continuation of application Ser. No. 585,568, filed Oct. 10, 1968, now abandoned.

According to the invention, the mobile load carrier is provided with means for positioning the load support which is to receive or deliver the load, at substantially the same level as the dock from or to which the load is to be transferred. It is also possible to have the load support inclined up or down to further facilitate loading and reduce muscular exertion by the loaders.

BACKGROUND OF THE INVENTION

The transport and receiving or delivery of heavy furniture or appliances requires a transport vehicle to carry often two and occasionally three husky men, who are engaged in strenuous physical exertion for very short periods amounting to a small fraction of their working time, while the remainder is spent sitting in the cab of the vehicle and riding around.

This is particularly wasteful in loading and unloading such items to and from the transport vehicle and a loading dock, or railroad car, or ship, or even the front or back porch of a residence.

The collection of refuse in large urban centers is being done increasingly with very large vehicles, too large to maneuver in alleys. An intermediate transfer vehicle is used, adapted to go into the alley and receive the contents of from thirty to fifty full garbage cans. Then the loaded transfer pickup moves out into the nearest open space to rendezvous with the big vehicle and transfer its entire contents *quickly* to the big vehicle, for the long haul to the dumping ground.

A few of such chores have previously been performed with special vehicles, each adapted to perform one specific chore, but equipment according to the invention has a much wider range of usefulness in a single transport vehicle of intermediate size, adaptable immediately to a large variety of different chores.

In one embodiment it is also possible to lower a portion of the load support carried by the chassis of a mobile vericle down to or substantially down to, the level of the terrain on which the wheels of the vehicle are resting.

Further objects and advantages of the invention will become apparent as the description proceeds.

In the accompanying drawings:

FIG. 1 is a side elevation of equipment according to the invention;

FIG. 2 is a side elevation of the same unit with the load support raised to a higher level but still horizontal;

FIG. 3 is a side elevation of the same equipment with the rear end of the load support at the same level as in FIG. 2 but the front end lifted to a higher level so that the support and tail gate slant up a little;

FIG. 4 is an elevation of the front end of the load support, indicating the position of the front hydraulic jack in front of it and the chassis below it;

FIG. 5 is a partial view of the parts illustrated in FIG. 4, as in section on line 5—5 of FIG. 4;

FIG. 6 is a detail of the corner of the tail gate indicating conventional fastening means;

FIG. 7 is a rear view of the load support and associated parts;

FIG. 8 is a perspective of the intermediate base, indicating the orientation and potential movement of the parts for holding the load support in its various positions;

FIG. 9 is a detail on line 9 of FIG. 5;

FIG. 10 is a side elevation of the rear end of a modified construction;

FIG. 11 is a view of the same parts with the tailgate lowered below the level of the load support, and below the level of the rear wheels;

FIG. 12 is a side elevation of the same parts with the rear end of the load support raised and inclined slightly downward and forward;

FIG. 13 is an enlarged view of a portion of the parts illustrated in FIG. 12; and FIG. 14 is a rear view of the parts illustrated in FIG. 13.

In the embodiment of the invention selected for illustration in FIGS. 1 to 9 inclusive, we have indicated a conventional motor vehicle chassis frame 11 having a front cab 10, dirigible front wheels 12 and rear wheels 14. On this chassis rests an intermediate base frame having longitudinal side beams 16 and 18, conventionally fastened to the chassis frame 11, which is conventionally assembled with the running gear. Referring for convenience to FIG. 8 we have illustrated a radius element in the form of a U-shaped frame including a rear crosspiece 20 and forwardly extending side arms 22 and 24 positioned to lie beside and outside the beams 16 and 18 when in their lowest position, and to rotate counterclockwise from lowered position around a transverse axis at 26, near the front end of the work support.

The load support 28 is fastened to supporting beams 30, and the rear ends of the beams 30 are pivoted to the rear ends of the radius legs 22 and 24 at 32.

Means are provided for lifting the rear ends of the radius legs 22 and 24 to elevate the rear end of the load support 28. We have indicated twin hydraulic jacks 34 to deliver upward thrust to the crossbeam 20 and lift the parts to the inclined position illustrated in FIG. 8. The jacks are supported at their lower ends on a drop yoke 36 integrally united to the beams 16 and 18, and provided with the usual pivotal connections 38 to permit the hydraulic jacks 34 to have the necessary angular movement for the functioning of the linkage.

At the front end we provide a single centrally positioned hydraulic jack 40 pivoted at 42 on the frame and at 44 to the top of the load support 28 at the front end. To secure a compact arrangement and still permit the jack 40 to lift the front end of the load support much higher than the rear end, we provide a recess 46 in the center of the front wall 47 of the load support. This permits moving the support up to the position of FIG. 3, and even higher, and at the same time reduces by several inches the necessary longitudinal clearance between these parts and the cab 10.

The load support 28 is illustrated as having continuous side walls 29 and a continuous floor 31, but it will be obvious that the floor 31 is equally effective by itself with loads that require no side retaining means.

Tailgate means are provided at the rear of the load support to close the otherwise open rear end of the load support, while still utilizing the entirety of the space within the rectangular parallelepipedon defined by the support structure with side walls 31 and a front wall 47. Referring principally to FIGS. 5, 6, and 9, the tailgate comprises a panel 48 having rigid triangular side wings 50 at each side. The inner or lower edge of the panel 48 is rolled into a tubular female pintle member 52 and the outer or upper edge is rolled into a similar tube 54, which stiffens the panel structurally and also houses a conventional locking bolt 56 adapted to slide out laterally and enter a suitable aperture in a cooperating lug 58 on the support.

It will be obvious that with the truck close to a loading platform, as indicated at 60 in FIGS. 2 and 3, the load support can be lifted level with the platform as in FIG. 2, and raising both ends to the same level will permit goods to be loaded or unloaded by horizontal movement, without any lifting. But whenever the goods are heavy and are being unloaded, the position of FIG. 3 requires only lifting the front end higher than the rear end, and gravity will materially assist the unloaders. Similarly, positioning the front end lower than the rear end will give gravity assistance in loading goods into the truck.

Connections are provided between the body 28 and the tailgate for limiting the opening movement of the tailgate to a position in the plane of the load support. In FIG. 9 we have indicated angle reinforcements 62 located inside and welded to the edges of an outer side plate 64 and an inner side plate 66 forming the rear panel of the conventional side wall 29 of the load support 28. The adjacent edge of the side wing 50 is reinforced by a T beam 68 with its crosspiece 70 overlying the adjacent legs of both the angles 62 as clearly shown in FIG. 9. This prevents counterclockwise rotation of the tailgate beyond the positions indicated in FIGS. 2 and 3.

In the embodiment of FIGS. 10 to 14 inclusive the tailgate is supported for movement away from the body 28 on a linkage that may lower it down near to or on to the supporting terrain for the wheels of the truck, or a mere change in proportions may permit it to be lowered below that level.

The hoisting jack 102 is pivoted at its lower end to the transverse rod 101, passing through supporting plates 103 welded to the bottom of the drop yoke 36, and reinforced by a flange 105 welded to the rod 101, one of the plates 103 and an adjacent portion of the yoke 36. The upper end of each jack 102 is pivoted at 104 to the first link 106 of a linkage of four links. The link 106 is pivoted at 108 on the side wall 29 of the load carrier 28 and is illustrated in FIG. 13 at its uppermost position, with respect to the load carrier. This link 106 projects beyond its pivotal connection at 104 far enough to provide a pivotal connection at 110 with a floating pitman 112 which constitutes the tailgate support. This linkage is provided in duplicate on opposite sides of the unit.

It will be apparent that retraction of the jack 102 will let the link 106 rotate clockwise as seen in FIG. 13 until the pivot 110 is vertically below its full line position and substantially level with the floor of the load support, The lower end of the pitman 112 is connected pivotally at 114 to a rigid link 116, which link is pivoted at 118 to the lower end of a post 120 rigid with and projecting downwardly below the load suport 28.

The fourth link, completing the linkage of four links, is the rigid structure of the load carrier itself, which carries the pivots 108 and 118.

From the position of FIG. 13 the jack 102 may continue to move the pivot 104 upward and to the left along the line indicated by the arrow 122 in FIG. 13, and the pivot 110 moves in the same direction and with slightly greater speed. This pivot underlies an overhanging upper member 124 of the load support 28 and comes into abutment with that member in the position of FIG. 13. This prevents further movement of any of the three movable links of the linkage, with respect to the body 28, but it lifts the body 28 around the pivot 26 at the front end of the radius rod 22, so that the same positions indicated in FIGS. 2 and 3 for the body are still available when desired.

It is noted that the pivot at 114 is also moving in the direction of the arrow 125, which arrow points upwardly and to the left at an angle of approximately 45 degrees to the horizontal.

Thus, at the instant that the pivot 110 strikes the seating member 124, the entire structure of the pitman 112 and the tailgate 126 pivoted on the pivot 114 and restrained from clockwise rotation about that pivot by the same abutment illustrated in FIG. 9 for the tailgate 48, will have a substantial velocity in the direction of the arrow 124 and a man standing on the load support 28 to receive a box or other item of load rising with the tailgate 126, will have the supported object delivered to his hands with a substantial velocity in the direction in which he will need to pull on it to move it forward onto the load support.

Because the link 116 is approximately half as long as the link 106 the downward movement of link 106 through an angle of approximately 75 degrees will be accompanied by a downward movement of link 116 through an angle of approximately 120 degrees to such a position as that of FIG. 11, where the tailgate is at a level somewhat below the level of the rear wheels 14. During the descent of the pitman 112, its upper end will move rearwardly a little from the vertical plane it occupies in FIG. 13 and then forward again to a position vertically below the position of FIG. 13. The lower pivot 114 will be displaced downwardly by the same vertical distance, but the shorter radius determined by the shorter length of the link 116 will cause the path of pivot 114 to move rearwardly approximately twice as much as the rearward travel of the pivot 110. Thus, at the midpoint, the tailgate 126 will slant down and to the left as viewed in FIG. 13 by an angle of approximately ten degrees, and the tendency of the load on the tailgate to slip to the rear with respect to the tailgate when the rearward movement of pivot 114 ends and the forward movement begins, is substantially counteracted by the inclination of the tailgate.

Because the links 112 and 116 are opened to an angle of about 135 degrees in the position of FIG. 13, the velocity of the pivot 114 will be approximately 50% greater than the velocity of the pivot 110. In actual practice the speeds are too small to lift the container but at the instant that the pivotal movements of the linkage are abruptly interrupted by the engagement with the ceiling 124, something like 10% of the weight will be overcome for a fraction of a second, and the forward movement of the gate will also be checked with a jolt. If an experienced operator is standing on the load support with his hands grasping a heavy package and pulling it toward him, this jolt will combine with a yank by the operator to start the package sliding forward. This little boost is afforded at the precise instant when a sprained back might result without it.

The tailgate 126 is provided with side wings 128, and a cleat 129 engages the link 112 and limits the clockwise rotation of the gate about the pivot 114. This permits the tailgate 128 to swing up until its outer stiffening rod 130 occupies the doted line position indicated in FIG. 13 closely adjacent the pivot 124.

With either type of tailgate mounting it is convenient to have the conventional hydraulic controls for the jacks 40 and 34 or 102 adjacent the rear ends of the body, where an operator standing on the ground beside the truck has convenient access to them while he is close to the rear end of the truck and the tailgate and can see to make precise adjustments qiuckly. We have indicated a conventional control lever at 132 for the front jack 40 and a companion control lever 134 for the jack 34 or 102.

As hydraulic jacks of the types illustrated, and the controls and connections for their use, are old and well known in the art, this disclosure has not been encumbered with constructional details of no inventive significance.

When the load is bulky and light it is often convenient to let the load pile up and extend out over the tailgate 126 with the tailgate remaining in the position of FIG. 13. During transit with the load so arranged, it is desirable to relieve the jack 102 of the weight of the rear end of the load support and load. I have indicated a simple steel hook 136 pivoted at 138 on the load support 28 and a drag link 140 running forward to an adjusting lever 142 near the control levers 132 and 134. The hook 136, in the full line position of FIG. 13, takes under a bracket 144 carried on the link 116 so that the post 120 and the link 116 provide a positive abutment that prevents lowering of the load support below the position of FIG. 13. A cross rod 143 functioning as a pintle for the lever 142, extends across to activate the companion hook 136 on the other side. If this position is with the load support resting on the base members 16 and 18, the jack 102 can be inactivated, but the load can be carried either with the floor 31 resting on beams 16 and 18 as in FIG. 1, or raised above them as in FIGS. 12 and 13.

We have indicated the location of the controls 132 and 134, and a pressure tank may be in any convenient location, as on the chassis at 23 (see FIGS. 1, 2, 3). The controls are where an operator adjusting the hoists will be beside the rear end of the load carrier, and can observe the movement of the parts.

In ordinary loading and unloading, whenever, the load is fairly heavy, the presence or absence of the load will lower or raise the floor 31 materially. The operator can set the floor 31 at the exact level to minimize effort and jolting when items of load shift to or from the platform 60 at the outset. Whenever a load change upsets that adjustment, a touch on the control lever 134 or 132 restores the correct position for the load carrier.

One of the most advantageous uses for equipment according to the invention is for special pick-ups, to save mileage on the larger compacting units. The refuse can be dumped on the load carrier loose, or in cartons, as may be convenient, and the small unit can then find or intercept a large compacting unit and empty its load into the hopper of the large unit.

As a delivery unit for air freight, and for package freight from ships or railroad cars, the nature of the packages can determine where to put the tailgate and load carrier. If the terrain permits it, the running gear can be so low that the load carrier can slant down and forward about twenty degrees to help the loaders slide the load on, and later the slant can be reversed to help them slide it off.

Others may readily adapt the invention for use under various conditions of service by employing one or more of the novel features disclosed, or equivalents thereof.

We claim:
1. Load-carrying equipment, comprising, in combination: a load support having a front end and a rear end; an underlying stationary base support carrying said load support; power lifting means on said base support for raising and lowering the rear end of said load support and holding it in any desired raised position without raising the front end of said load support; a tail gate support at the rear end of said load support; a tail gate; an operative gate connection between said tail gate and said tail gate support for rotating said tail gate up to closed position, substantially normal to said load support and extending upwardly, or downward and rearward from said closed position to open position; said open position being approximately a rearward continuation of said load support; and independent power lifting means on said base support for raising and lowering the front end of said load support and holding it in any desired raised position.

2. A combination according to claim 1 in combination with a base linkage connected at one end to said base support remote from the rear ends of both supports, and at its rear end to said load support adjacent to the rear end of said load support; said linkage being adapted to guide the rising of the rear end of said load support in a predetermined approximately vertical path with respect to said base support.

3. A combination according to claim 2 in which said base linkage is a rigid link pivoted on a transverse axis at its front end to said base support; said link being pivoted at its rear end to said load support on a transverse axis; said link guiding the upward movement of the rear end of said load support in an arcuate path of large radius and small curvature.

4. A combination according to claim 3 in which control means accessible to an operator is positioned adjacent one rear corner of said load support; said control means including independent control connections for each of said front and rear power lifting means.

5. A combination according to claim 4 in combination with conventional mobile running gear underlying and operatively supporting said base support.

6. A combination according to claim 1 in combination with a linkage interconnecting said tailgate support and load support for guiding said tailgate support in movement from an uppermost position as recited in claim 1, in a downward movement to a lowermost position remote from and approximately vertically below its uppermost position.

7. A combination according to claim 6 in which said load support is provided with stop means to limit the upward movement of said tailgate support.

8. A combination according to claim 7 in which said rear end power-lifting means is connected to said tailgate support; whereby said power lifting means does not lift the rear end of said load support until after said tailgate support has engaged its stop means.

9. A combination according to claim 6 in which said tailgate support and linkage is in duplicate adjacent opposite sides of the rear end of said load support; each linkage comprising three moveable links and one relatively fixed link; a first link having its forward end pivoted to said load support approximately midway between the uppermost and lowermost levels of the upper end of said tailgate support; said first link extending rearwardly and upwardly when in uppermost position to a position vertically above the rear end of said load support; said first link moving from its uppermost position downwardly to bring its rear end to the elevel of said load support and adjacent said load support; the second link consisting of said tailgate support itself, pivoted at its upper end to the rear end of said first link, and when in uppermost position extending down to the level of said load support adjacent the rear end of said load support; a third link pivoted to the lower end of said second link and in uppermost position extending downwardly and forwardly; the forward end of said third link being pivoted to said load support at a level approximately midway between the uppermost and lowermost positions of the rear end of said third link; said load support itself constituting the fixed link of said linkage and having pivotal connection with the forward end of said third link, and the forward end of said first link.

10. A combination according to claim 9 in which said third link is materially shorter than said first link; whereby the path of the lower end of said second link and the tailgate support deviates to the rear at mid-position more than the deviation of the upper end of said tailgate support, and the slight forward and downward inclination of said open tailgate at mid-position counteracts any tendency of a load resting on said tailgate to slip rearwardly; said tailgate thus delivering its load, at the end of the tailgate movement, with a substantial velocity in a substantially diagonal direction, inclined upward and forward.

11. A unitary superstructure adapted to be conventionally fastened on a conventional vehicle chassis, comprising, in combination: a stationary base frame adapted to be mounted on a conventional chassis frame, a load carrier supported on said base frame; said carrier having a floor and side walls and an open rear end; a first power-actuated hoist means on said base frame at the front end of said carrier for raising it to various desired positions spaced above said base frame; and a second, independent, power-actuated hoist means for raising the rear end of said carrier to various desired positions spaced above said base frame; said second power-actuated hoist means comprising two hoist mechanisms laterally spaced apart and located outside said carrier, and leaving the rear end of said carrier unobstructed for receiving or discharging a load.

12. A combination according to claim 11 in combination with a moveable rear gate mechanism comprising a gate proper adapted, in closed position, to close the open rear end of said carrier; and mechanism connecting said gate proper with said carrier and base frame, for holding said gate, in opened position, at the level of said floor, as a rearward continuation of said floor, and for lowering said opened gate to positions below the level of said floor; and power means for actuating said rear gate in movement from its lowered position up to the level of said floor, and then by rotation around a transverse axis along its front and lower edge into a vertical plane where it closes the rear end of said carrier, and then upward in unison with the rear end of said carrier.

13. A combination according to claim 11 in which said hoist means is located below the floor of said carrier.

14. Transport trucking equipment comprising a vehicle having running gear and a longitudinally extending framework carried by said running gear and affixed thereto; a load support also extending longitudinally and resting on said framework; rear end guide means on said framework to guide movement of the rear end of said load support from a lowermost position of rest on said framework into an elevated position above said framework; rear end power hoist means for lifting said rear end only and holding it in a selected elevated position; and an additional independent front end power hoist means for raising the front end of said support only, independent of the elevation of said rear end.

15. Equipment according to claim 14 in combination with an additional independent front end power hoist means for raising the front end of said support only, independent of the elevation of said rear end.

16. Equipment according to claim 15 in which independent control means is provided for each of said hoist means; both said control means being located near each other and at a position readily accessible to an operator standing on the ground beside said equipment with a good view of the rear end of said load support.

17. Equipment according to claim 14 in which said framework includes a conventional motor vehicle chassis, and an intermediate stationary frame resting on said chassis; said intermediate frame being connected with and supporting said load support; said intermediate support and both said hoist means being removeable from said chassis as a separate unit.

18. Equipment according to claim 14 in which said rear end guide means is a pair of radius rods extending along opposite sides of said framework; the rear ends of said radius rods being pivoted to the rear corners of said load support on a transverse axis; the front ends of said radius rods being pivoted to said framework on a stationary transverse axis near the front end of said load support.

19. Equipment according to claim 14 in combination with a rear closure gate, having pintle means connecting two adjacent corners of said gate and the rear end corners of said load support to define a transverse axis of rotation for said gate, from a closed position extending upward from the rear end of said load support, down to an open position coplanar with said support and forming a rearward extension of said support; and power means for closing and opening said gate.

20. Equipment according to claim 19 in which a mechanical transmission connects said rear end power hoist means and said rear gate, to rotate said gate up into closed position, and then by further upward movement to raise said support and gate in unison to a selected, elevated position.

21. Equipment according to claim 20 in which said closure gate pintle means is mechanically connected to the rear end of said load support, to permit it to slide below the level of said support down toward the ground; there being an abutment preventing said pintle means from going above said load support; said power hoist means raving a transmission for lifting said pintle means from lowered position near the ground to the level of said load support in its position of rest, then by continued movement rotating said gate up into a vertical closed position, and finally by additional continued movement raising both the rear end of said support and said closed gate in unison.

22. Load-carrying equipment comprising, in combination: a load support having ends identified for convenience as a front end and a rear end; an underlying stationary base support carrying said load support; a first power lifting means on said base support for adjusting the height of the rear end of said load support; said first lifting means being pivoted on a transverse axis to the rear end of said load support and extending downwardly and being pivoted at its lower end on a transverse axis to said base support; a second power lifting means for adjusting the height of the front end of said load support; said second power lifting means having an upper end pivoted on a transverse axis to the front end of said load support, and at its lower end on a transverse axis to said base support; independent operator-controlled means for each lifting means for raising the corresponding end of said load support and holding it in any adjusted position; and a longitudinally extending guiding connection pivoted at one end to said base support on a transverse axis adjacent one end of said load support, and at its other end to said load support at the other end of said load support; whereby either end of said load support may be raised and lowered as desired without raising or lowering the other end, and without imposing a bending load on said guiding connection or on either or said power lifting means.

23. Transport trucking equipment comprising a vehicle having running gear and a longitudinally extending framework carried by said running gear and affixed thereto; a load support also extending longitudinally and resting on said framework; a tail gate support in the nature of a horizontal transverse pivot connection at the rear end of said load support; a tail gate on said support; stop means for limiting rotation of said tail gate from open position as a rearward horizontal extension of said load support, to a closed position as a vertical barrier extending up from the rear end of said support; said tail gate support and stop means being connected to said load support for movement from an upper position with said tail gate level with the rear end of said load support to a lowered position close to the plane of engagement between said running gear and the supporting terrain; operator-controlled power means including a first transmission for moving said tail gate support up and down; and a second transmission for lifting the rear end of said load support and said tail gate and tail gate support upward together in unison.

References Cited

UNITED STATES PATENTS

| | | | |
|---|---|---|---|
| 2,494,377 | 1/1950 | Cresci | 298—11 |
| 2,504,467 | 4/1950 | Thetford | 214—508 |
| 2,824,659 | 2/1958 | Erlinder | 214—75 |
| 3,066,984 | 12/1962 | Hori | 298—11 |

ROBERT G. SHERIDAN, Primary Examiner

U.S. Cl. X.R.

214—75, 512; 298—11